United States Patent

Howard

[15] 3,653,150

[45] Apr. 4, 1972

[54] SOLAR DISTILLATION IRRIGATION APPARATUS

[72] Inventor: Lloyd V. Howard, P.O. Box 78, Keno, Oreg. 97627

[22] Filed: Dec. 5, 1968

[21] Appl. No.: 781,404

[52] U.S. Cl. ...................................47/29, 47/27, 202/234, 203/DIG. 1, 203/10, 203/100
[51] Int. Cl. ...................................................A01g 13/04
[58] Field of Search ..................203/10, 100; 202/234, 83; 47/27, 38, 48.1, 29, 17, 27

[56] References Cited

UNITED STATES PATENTS

| | | | |
|---|---|---|---|
| 3,006,818 | 10/1961 | Lappala et al. | 47/38 X |
| 3,072,920 | 1/1963 | Yellott | 202/234 X |
| 3,337,418 | 8/1967 | Halacy | 202/83 |
| 3,314,862 | 4/1967 | Hay | 202/234 X |
| 3,461,606 | 8/1969 | Caloia | 47/48.5 |
| 2,910,994 | 11/1959 | Joy | 47/28.1 UX |
| 2,019,831 | 11/1935 | Ricardo | 47/17 |

FOREIGN PATENTS OR APPLICATIONS 1,075,888 2/1960 Germany ...........................47/28.1

OTHER PUBLICATIONS

Nature, " Irrigation of Plants with Atmospheric Water within the Desert" by Dr. I. Gindel, Vol. 207, September, 1965, pp. 1173– 1175.
British Plastics, June 1958, pp. 226, 227.
Modern Plastics, Film on the Farm, Vol. 34 No. 1 (September, 1956) pp. 112– 115.

Primary Examiner—Norman Yudkoff
Assistant Examiner—David Edwards
Attorney—Bernard A. Reiter

[57] ABSTRACT

A transparent plastic cover constructed and adapted to be deployed over and removed from a multi-acreage field. The plastic cover is supported on an appropriate beam structure and is drawn thereover by powered means. The side panels of the plastic cover contain water tubes which are drawn through a water filled trough in the ground contemporaneously with the covering operation in order to facilitate movement of the cover over its supporting structure. Upon deployment of the cover, the trough water level is lowered so as to tighten the cover down upon the structure.

1 Claim, 6 Drawing Figures

Lloyd V. Howard
INVENTOR

BY Bernard A. Reiter

ATTORNEY

Lloyd V. Howard
INVENTOR

BY  Bernard A. Reiter

ATTORNEY

SOLAR DISTILLATION IRRIGATION APPARATUS

BACKGROUND OF THE INVENTION

This invention pertains to an irrigation method for growing crops. More particularly, the invention pertains to an irrigation apparatus and method utilizing principles of solar distillation.

A more efficient and economical irrigation system for large scale farm crops is an objective which is continuously pursued by the entire agricultural industry. Numerous approaches have been made to the problems of irrigation heretofore. Large scale sprinkler systems may prove effective in the distribution of water but are prohibitively expensive in many instances due to the massive and intricate requirements for conduits, pumping and power sources. Cross ditching methods frequently prove ineffective due to the topical characteristics of the terrain and also due to the substantial losses of water due to atmospheric evaporation under elevated temperatures. Additionally, water losses occur in conventional irrigation systems due to transpiration or seepage into the soil, the latter occurring when water is not retained in the plant material or roots itself. Since less than 1 percent of the water passing through a plant is generally retained, substantial loss occurs from any available water supply. It is known for example that in the Great Plains area of the United States approximately 60 percent of the ambient water supply is lost due to evaporation alone.

In addition to the problems presented by evaporation, transpiration and by water absorbed by the earth itself exclusive of root areas, irrigation in geographical locations having only salt water or relatively small amounts of fresh water is economically unfeasible due to the relatively high processing costs in removing the saline characteristics.

SUMMARY OF THE INVENTION

In an effort to obviate each of the aforementioned shortcomings of prior irrigation systems and methods the present invention has as a primary objective thereof the provision for an irrigation structure and system which eliminates substantially all complex piping systems and power supplies.

A further objective resides in the provision for an irrigation system which utilizes solar energy as a source not only of saline removal and water purification in general but also as a means for distribution of water over a large acreage area.

A still further objective and feature of the invention is the provision for an irrigation system in which loss of water due to evaporation and transpiration is substantially eliminated.

Another objective and feature of the invention resides in the structure for an irrigation system which is both inexpensive to construct and economical to operate and maintain.

Yet another feature of the invention resides in the disclosure of a method for covering a crop with a transparent plastic sheet and for utilizing the transparent plastic sheet with existing solar energy in order to cause cyclic evaporation, distribution, and condensation of water beneath the covered area.

BRIEF DESCRIPTION OF THE DRAWINGS

These and numerous features and advantages of the invention will become apparent upon a reading of the following detailed description and appended claims taken in conjunction with the accompanying drawings, wherein like numerals denote like parts in the several views, and in which:

DETAILED DESCRIPTION

Figure 1:
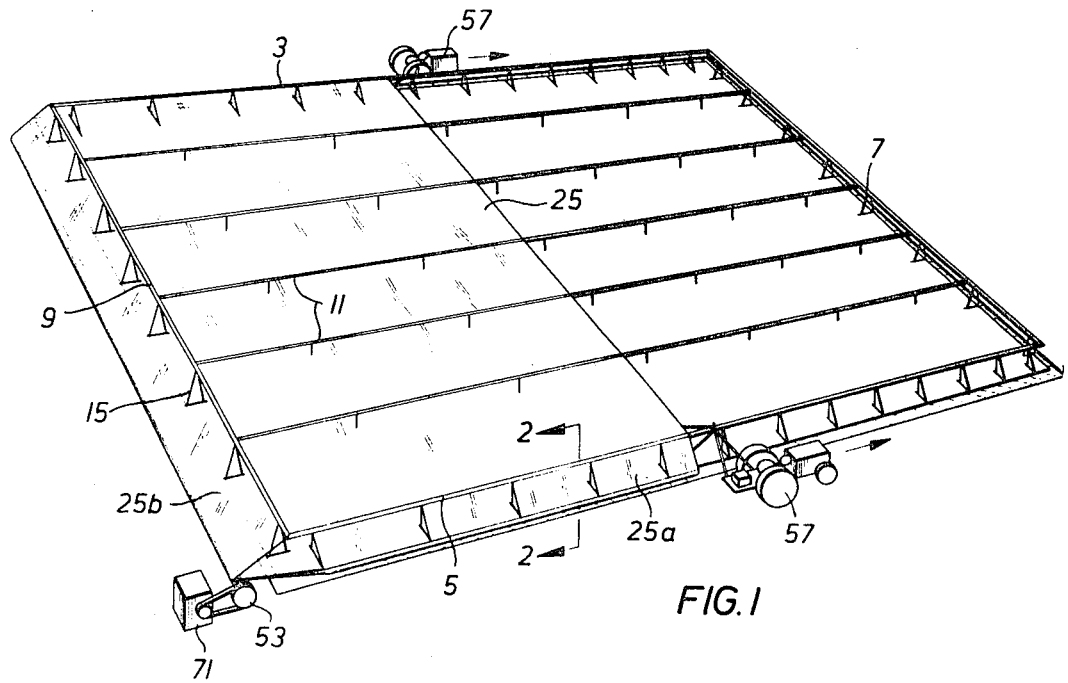
FIG. 1 is a perspective view of a preferred embodiment of the invention showing the transparent plastic cover partially deployed over a crop which is to be irrigated with evaporation-condensation principles.

With reference now to FIG. 1, there is shown in exemplary form a preferred embodiment of the evaporation-condensation irrigation system of the invention. The system structure essentially comprises a perimetal support beam that includes a pair of parallel longitudinally extending support beams 3, 5 and a pair of lateral support beams 7, 9 oriented in a manner perpendicular to the longitudinal support beams. Disposed intermediate the longitudinal support beams 3, 5 are a plurality of internal longitudinal support beams 11, which are disposed in a generally parallel manner. The longitudinal and lateral support beams are of substantial thickness and may be made of wood, aluminum or other appropriate material capable of supporting the transparent plastic cover and the loads which are placed thereon. These beams should preferably be of approximately 4 inches in diameter so as to enhance sliding of the cover thereacross and may, for example, be made of a rigid plastic such as polystyrene. It is contemplated that various types of coatings such as, for example, fiberglass one-sixteenth inch thick may be applied to or laminated over the beams in order to reduce frictional resistance to the cover. The intermediate longitudinal support beams 11 serve to prevent sag of the plastic cover between the perimetal support beams and therefore may be of lesser thickness than the perimetal load bearing structure. It is a primary function of these intermediate beams to take up slack in the cover and to thereby maintain the cover at a predetermined distance above the ground when opposite sides of the perimetal structure are at substantial distances from one another. By use of such internal longitudinal support means it is considered feasible to construct, in unitary form, a transparent plastic cover and structural support means over areas 660 feet wide in the lateral dimension and 1,320 feet in the longitudinal dimension. It will be recognized, however, that smaller or even larger systems may be constructed in accordance with local weather conditions and terrain features.

The basic vertical support structure 15 for the perimeter beams (see FIG. 2) may for exemplary purposes comprise a triangular construction having a base board 21 and a pair of angularly oriented side members 17, 19 fixedly connected thereto and to one another. The longitudinal support beam is similarly fixedly connected to the apex of the perimetal support structure. The side members 17, 19 and base boards 21 may be integrally connected to one another by means of longitudinal base boards 23 of any appropriate distance. It will be recognized that the perimetal support structures in general could be manufactured in sections and may be of foldable construction in order to facilitate erection and emplacement of the entire system.

Prior to erection and emplacement of the perimetal support structure 15 an evaporation basin for receiving a supply of water may be excavated from beneath the baseboards 21 and between the longitudinal base boards 23. The evaporation basin may be provided along one, several or all of the perimetal edges of the system depending upon the acreage to be covered. The evaporation basin should be lined with sheets of black plastic or other appropriate material in order to prevent seepage of water into the earth.

On the exterior side of the perimetal support structure there is provided a water ditch which may be dug either before or after the structure is erected. The water ditch may be approximately 10 to 18 inches deep and 10 to 20 inches wide and should, like the basin, be lined with sheets of black plastic or other material. It is the function of the water ditch to provide an anchoring means for the plastic cover 25, as explained in detail hereinafter.

The transparent plastic cover 25 serves as a flexible plastic vapor barrier on which water from the evaporation basin 29 condenses. Evaporation is of course brought about by the transmission of solar energy through the transparent cover in a manner which, in itself, is well known in the distillation art. Similarly light which is necessary for plant growth passes through the cover and provides therebeneath, in conjunction with the heat, atmospheric conditions conducive to good growth. Due to the black radiation- radiation-absorbtive surface lining the evaporation basin 29 the solar radiation is initially converted to heat which is conducted directly to the water in the basin. If the water is of saline nature it will, upon evaporation and subsequent condensation on the inner surface of the cover, be purified by leaving dissolved salt and other impurities in the evaporation basin. When the concentration of these impurities increase to a point where operation is impaired, such as solid salt accumulated in the evaporation basin, the feed water flow is increased for a short time to flush the concentrated solution from the basin and out of the system through an exit. The water which condenses on the vapor side of the cover will form small drops which grow by merging and flowing short distances along the underside toward the low point of the sag between the intermediate longitudinal support beams. When the drops become of sufficient size they will drop from the cover onto the ground below. In order to increase the rate of irrigation by the evaporation condensation process it will be recognized that a plurality of evaporation basins may be provided at predetermined interim lateral distances. The cover itself should be of relatively light weight material in order to minimize support structure loading and to facilitate transportation extension and removal. It must be of sufficient strength to withstand moderate wind and weather effects and also to withstand its own weight over large unsupported longitudinal distances. Similarly, it should be of durable material so as to withstand light and weather exposure and several cycles of extension and removal annually. Other desirable characteristics such as low permeability are self evident. Of the numerous characteristics mentioned, transparancy to solar radiation is of cardinal importance in actual operation of the system. Although the transparent cover 25 need not be completely transparent to all solar radiation, such as ultra-violet radiation and some of the long-wave-length infa-red radiation, it should be substantially transparent to the total incident solar energy. Therefore "substantially transparent" is meant to exclude translucent materials and is intended to include materials which transmit at least about 60 percent or more of the incident solar radiation. For example materials such as polyethylene, polyvinyl chloride, or polyvinyl idene chloride or numerous others may be used. The ultimate choice of material for the cover will be determined, however, not only on its characteristic pertaining to solar energy transparancy but also upon structural characteristics such as tensile strength, tear strength and percent elongation, each of these factors being taken and viewed in consideration of the expected weather conditions under which the cover will operate.

Figure 3:
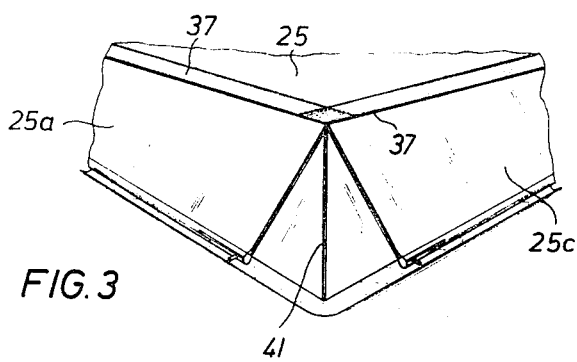
FIG. 3 is a perspective view showing a corner portion of the intersecting side and end panels.

The cover, though integral in construction, includes a top panel, longitudinal side panels 25a, and end panels 25b, c, (see FIG. 3). The panels and top can be fabricated into a unitary piece by conventional plastic heat fusing procedures in order to produce a cover of appropriate size. Appropriate reinforcing strips or tapes 37 can be affixed to the plastic cover at those sections or points where substantial tensile forces will be applied during the deployment and removal operations. The terminal edges of the side and end panels 25a, 25c, respectively, are provided with a plastic zipper means 41 so that upon completion of the deployment operation, atmospheric integrity of the enclosed area is insured.

Figure 2:
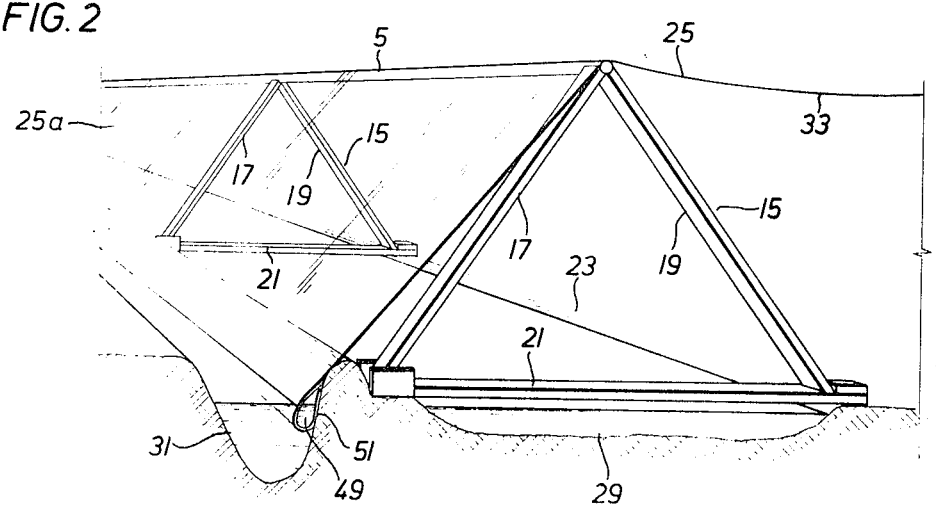
FIG. 2 is an end view along the plane 2—2 of FIG. 1 showing in detail the perimetal support structure of the irrigation system.
Figure 4:
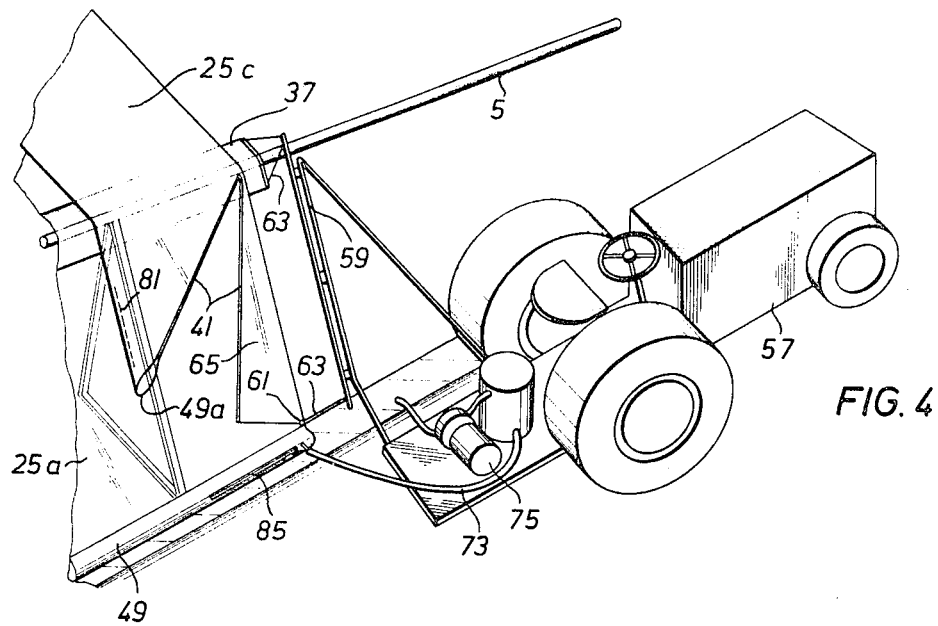
FIG. 4 is a perspective view showing in enlarged form the tractor and deployment connections of FIG. 1.

As best shown in FIGS. 2 through 4 the lower end of both side panels and end panels, 5 and 7, 9 respectively, are characterized by an overlapping of the panel edge so as to create a tubular like construction which in fact is referred to as the water tube 49 or weight holding means. The overlapping construction may be accomplished by heat sealing or fusion of the panel ends to the panel itself along the length thereof. The terminal edge of each of the water tubes may be reinforced with an internally disposed, preformed rod or wire means so as to maintain the tube in an open manner as shown in FIG. 2. As the cover is pulled upon the support structure the water tube 49 is pulled through the water ditch 31 and is filled with water by a pump mechanism 75 on the tractor platform, thereby providing an anchoring means for the side panels and the cover as a whole, as explained hereinafter.

With reference now to FIGS. 1 and 4, deployment of the transparent plastic cover 25 is initiated after the cover has been properly situated on a cleared strip adjacent the field and subsequently rolled onto its permanent take up roller 53. A section of the cover is then unrolled a necessary distance and manually positioned over the lateral support beams 9 and the end of longitudinal support beams 3, 5. A pair of tractors or other vehicles 57 are backed into position adjacent the end of the cover and a pull rod 59 carried by each tractor is tied to the reinforced pull strips 37 of the cover 25 and also to the bottom edge of each side panel 25a through a reinforced eyelet 61 by means of the cords 63. The triangular corner flap section 65 of each side panel 25a and the end panel 25c are folded backwardly over the cover during the deployment operation. The tractors then proceed, at an identical rate of speed, to pull the cover over the supporting structure while the drive motor 71 of take up roll 53 unwinds the cover at a rate sufficient to alleviate substantial tensile forces in the material. Prior to the pulling of the cover over the structure by the tractors, the water level in ditch 31 is raised to its upper level. In this way, as the cover is pulled over the structure by the tractors, the side panels are raised up slightly due to the higher level of water within the water ditch. As the cover progresses down the longitudinal beams water is pumped into the water tube by means of a hose 73 connected to pump mechanism 75 on the tractor platform. Water is drawn from the ditch 31 itself by the pump and into hose 73 in order to fill the water tube 49. As the water tube 49 is filled it may be visualized that same becomes an anchor means which may be raised or lowered in accordance with the level of water in the ditch or trough in order to tighten or to reduce the pressure of the cover on its supporting structure. During deployment and removal of the cover the water level in the ditch would be raised in order to reduce the frictional forces between the cover and the structure, thereby facilitating the movement of the cover thereover. When the cover is pulled the length of the field the tractor units are disconnected from the sides and the end panel 25b is removed from the takeup roll while end panel 25c is unfolded and placed on the side of the support structure with water tube 49a submerged beneath the water surface in perimetal ditch 31. The hose 73 from tractors 57 may be connected to the water tubes 49a of each end panel 25b, 25c so as to fill said tubes to provide the anchoring function. When this is completed the cover is secured by connecting the side and end panels via zipper or other connection means 41. The water level in perimetal ditch 31 is then lowered so as to secure the cover firmly against the supporting structure.

Removal of the cover from the supporting structure is accomplished by merely unzipping the connection means 41 and spilling the water from the water tube 49a which is remote from the take up roll 53. Spillage of water from the water tube 49a may be facilitated by utilization of a series of elongate zippers 81 in the tube itself. After the tube 49a is empty, end panel 25c is folded backwardly over the top panel of the cover and zippers 85 and water tube 49 are opened to facilitate spillage of the water from the water tubes during the retraction procedure. End panel 25b is connected to the takeup roll after removal of the water from its respective water tube in the same manner as the water was removed from end panel 25c. Retraction is then initiated by operation of the drive motor 71 and as the cover is wound on takeup roll 53 water is permitted to easily spill from water tube 49 via the open zippered section 85. It is thus seen that the tractors 57 are necessary only for deployment of the cover and that retraction thereof is accomplished quickly and efficiently after the two end panels 25b and 25c are emptied and appropriately secured.

Figure 5:
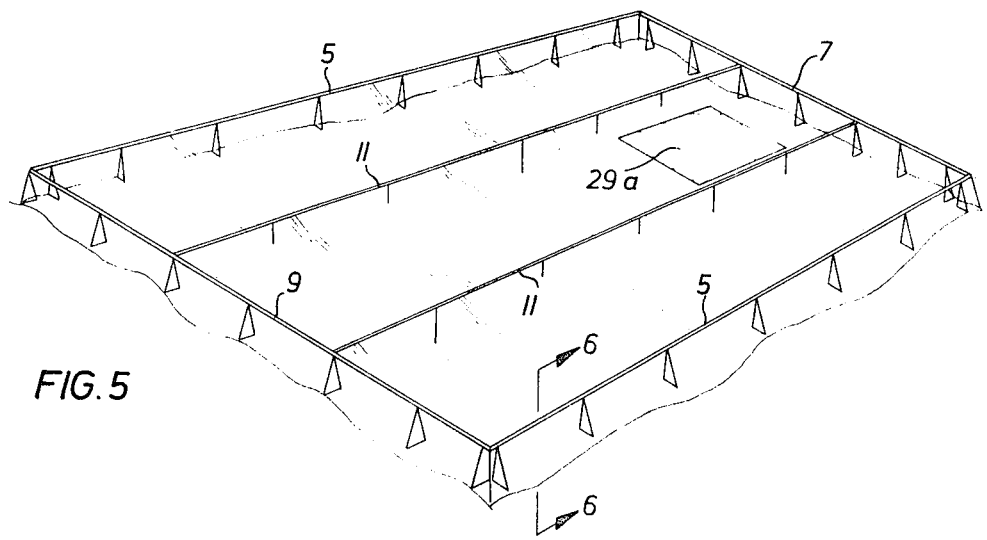
FIG. 5 is a modified form of the irrigation system of the invention when used on hilly or otherwise uneven terrain.
Figure 6:
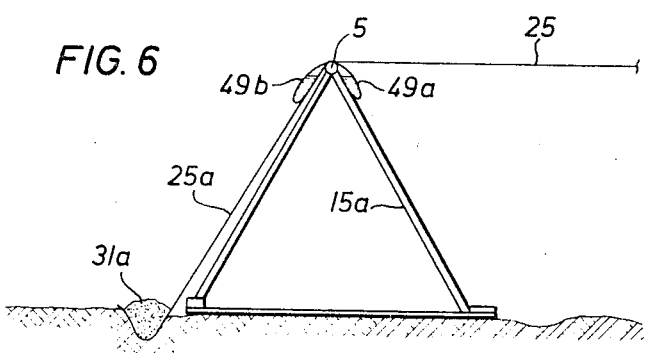
FIG. 6 is a sectional view along the plane 6—6 of FIG. 5.

With respect to FIGS. 5 and 6 there is shown a cover such as may be used on hilly or uneven terrain. Here a central evaporation basin 29a is employed since it is not feasible, due to gravitational flow, to utilize a perimetal basin. Similarly since it is not feasible to utilize a perimetal water ditch for the same reason, the sidepanels 25a are anchored at their lower ends in a dirt filled ditch 31a and at their upper ends by a plastic tube identical in construction to the water tube 49 described hereinbefore. This tube is filled with water by means of a pumping mechanism 75 and hose 73 from tractor 57 after the side panel 25a is appropriately placed over the longitudinal support beam 5. Thereafter the top panel of plastic cover 25 is laid on top of the positioned side panel 25a and a similar water tube 49b which is integral with the top panel is filled in an identical manner from tractor 57. The perimetal support structure 15a is in all respects substantially similar to the perimetal support structure 15 described with reference to FIG. 2, except that the length of each section of the support structure may be less due to the uneven terrain. Operation of each of the structures shown in FIGS. 1 and 5 are identical in that solar energy is utilized to evaporate water from the water basins which water then condenses on the undersurface of the plastic cover and subsequently drips on to the crops below.

Although there has been described a preferred embodiment of the invention, many variations and modifications will be apparent to those skilled in the art. In view thereof, this invention is to be limited not by the specific disclosure herein but only by the claims appended hereto.

That which is claimed and desired to be secured by United States Letters Patent is:

1. An apparatus for solar distillation and irrigation over multi-acreage terrain comprising:
    a supporting structure means for slidably receiving thereover a light transmitting cover,
    a flexible plastic light transmitting cover deployed over said supporting structure means, said having an integral tubular weight holding means near the edges of the cover and formed by an overlaping of the light transmitting cover and having fluid therein so as to apply tension to the cover during deployment and removal, thus allowing for operation of the cover over large areas and,
    weight adjustment trough means disposed in operational relation to said tubular weight means and having water therein to buoy the tubular weight means and means for raising or lowering the water level in said trough to thereby increase or reduce the pressure of said cover means on said support structure so as to selectively vary the tension applied to the cover during deployment, operation, and removal.

* * * * *